United States Patent [19]

Luginbühl

[11] Patent Number: 4,598,442
[45] Date of Patent: Jul. 8, 1986

[54] CLAMPING DEVICE FOR CABLES AND ROPE

[75] Inventor: Otto Luginbühl, Oberthal, Switzerland

[73] Assignee: Willy Habegger, Hunibach bei Thun, Switzerland

[21] Appl. No.: 585,974

[22] Filed: Mar. 5, 1984

[30] Foreign Application Priority Data

Mar. 5, 1983 [DE] Fed. Rep. of Germany ....... 3307914

[51] Int. Cl.$^4$ .................................................. F16G 11/00
[52] U.S. Cl. ................................. 24/132 R; 24/134 N
[58] Field of Search ......... 24/134 N, 132 R, 132 WL, 24/134 R, 134 KB, 134 L, 134 P, 463; 188/65.1; 226/163, 164; 254/251, 253, 254, 258

[56] References Cited

U.S. PATENT DOCUMENTS

| | | | |
|---|---|---|---|
| 375,997 | 1/1888 | Harris | 24/134 L |
| 1,244,136 | 10/1917 | Segerdahl et al. | 24/134 N |
| 1,942,625 | 1/1934 | Whalan et al. | 24/132 R |
| 3,586,226 | 6/1971 | Nippert, Sr. | 226/163 X |
| 3,732,598 | 5/1973 | Hatay | 24/134 N |
| 3,840,212 | 10/1974 | Latanision | 188/65.1 X |
| 3,863,893 | 2/1975 | Cavalieri | 254/254 X |
| 3,943,743 | 3/1976 | Wetzels et al. | 226/164 X |
| 4,106,753 | 8/1978 | Cavalieri et al. | 188/65.1 X |
| 4,448,393 | 5/1984 | Habegger et al. | 254/254 X |
| 4,483,517 | 11/1984 | Cavalieri | 24/132 WL X |

FOREIGN PATENT DOCUMENTS

| | | | |
|---|---|---|---|
| 2600066 | 7/1976 | Fed. Rep. of Germany | 254/254 |
| 2917667 | 11/1980 | Fed. Rep. of Germany | 254/254 |

Primary Examiner—William E. Lyddane
Assistant Examiner—James R. Brittain
Attorney, Agent, or Firm—McGlew and Tuttle

[57] ABSTRACT

A clamping device comprises a holder in which an actuation arm is movable in a longitudinal directions. A fixed clamping jaw is carried by the holder and a movable clamping jaw is arranged within the holder opposite to the fixed clamping jaw and it is supported by at least two longitudinally spaced lever members which have a first pivotal connection to the holder, a second pivotal connection to the movable clamping jaw and a third pivotal connection to the actuator arm. An actuator is connected to the arm to move it backwardly and forwardly for opening and closing the jaws. The pivotal connecting points of the levers are chosen so that the pivot points are disposed at substantially right angles to each other. The pivot pins are cylindrical hinge pins and the line between the pivotal connection of the lever to the jaw and to the fixed holder makes an angle of 45° to the horizontal so that a larger distance between the points of support is possible.

5 Claims, 7 Drawing Figures

CLAMPING DEVICE FOR CABLES AND ROPE

FIELD AND BACKGROUND OF THE INVENTION

This invention relates in general to clamping devices and in particular to a new and useful clamping device particularly for ropes or cables.

There are known tackles equipped with such clamping devices, where the clamping levers as a rule form with the clamping jaws a parallelogram of joints. Such clamping devices have the disadvantage that they may suddenly let the cable or rope slip through as soon as the diameter of the rope becomes reduced due to the acting load and the increasing pressure. In practice, attempts have been made to counteract this by providing particularly compact special ropes. However, the slipping of the rope cannot be prevented if the force loading of the rope exceeds the frictional force between the jaws and the rope. Further, the introduction of the rope is usually difficult in known clamping devices having a parallelogram of clamping jaws.

SUMMARY OF THE INVENTION

The invention is directed to a rope clamping device in which the closing travel of the clamping jaws is relatively long and the clamping force is progressive, so that the clamping device may be used for ropes of various construction, both for anchoring, guying, etc. of such ropes and also in a tackle.

In accordance with the invention a clamping device includes a holder with an actuation arm extending longitudinally in the holder alongside a fixed clamping jaw carried by the holder. A movable clamping jaw is arranged within the holder opposite to the fixed clamping jaw and it is supported by at least two longitudinally spaced lever members which have a first pivotal connection to the holder, a second pivotal connection to the movable clamping jaw and a third pivotal connection to the actuator arm. An actuator is connected to the arm to displace it substantially in a longitudinal direction to effect pivoting of the levers and movement of the movable jaw relative to the fixed jaw. The jaws are advantageously formed with receiving grooves arranged in opposition so that the rope may be guided therebetween.

This results in a clearance for the rope having a relatively large play between the opened clamping jaws. Further, due to the design of the clamping levers as angle levers for a single movable clamping jaw, a slipping of the rope is securely prevented at any diameter reduction of the rope because the clamping ratio increases with the increasing load and, in addition, the frictional force increases with the reduced diameter. Consequently, with the inventive device, the critical point where the load of the rope equals or is larger than the frictional force, is never reached.

The actuator is advantageously formed as a fluid pressure operated piston and cylinder system or as a simple fluid pressure operated drive motor which is connected to the actuator arm. The holder advantageously includes a central member which forms part of the fixed jaw and two side members or cheeks on respective sides spaced outwardly of the jaws far enough to accommodate an actuator arm on each side thereof. The actuator arms are advantageously connected to a common yoke which forms a connection for the fluid pressure operated actuator. The arms advantageously extend out beyond the holder for connection to the actuator. The levers have three separate hinge points which are located so as to form an obtuse triangle. Advantageously two pairs of angle levers are provided at least for the clamping jaw. It is possible with the invention to provide a plurality of clamping jaws sections preferably each section has two pairs of angle levers associated with each movable jaw.

In a preferred form of construction the holder comprises a member having a fixed central portion connected to the fixed jaw and side walls which form a hinge point for each of the hinge levers leaving sufficient space between the side walls and the jaws for the actuator arm which extends through the holder. The arms are advantageously connected to a yoke which may be moved to include pressure operated motor in the form of a piston and cylinder for spindle drive etc. By arranging the pivot points of the levers so as to form an obtuse angle, an optimum clamping ratio and a great variety of clearance openings between the clamping jaws may be obtained. It is possible to provide correcting inserts between the clamping jaws and the holder to compensate for inaccuracies in manufacture and unexpected variations in the size of the rope.

Advantageously, the holder is provided with brackets at each end having openings for guide rods which for example advantageously provide means for mounting one or more of the holders in a row along with their associated fluid pressure operated piston and cylinder actuators which may be supported on the brackets. It is of importance by itself that a clamping device of this construction is suitable for a tackle having at least two pairs of clamping jaws operating on the rope, of which at least one is movable back and forth by its rod unit under interposition by motion control so as to execute the working stroke. This motion control also operates on the actuator of the two clamping devices or pairs of clamping jaws which may be of identical design.

The advantages obtained with the invention are substantially that a clamping device is obtained for anchoring, guying, etc. of ropes, but also for being used in a tackle, in which the closing travel of the clamping jaws is long and the clamping force is progressive, so that a reliable seizure of the rope is ensured, and consequently, an unintentional slipping of the rope is prevented. In a preferred embodiment, a detachable clamping jaw facilitates the introduction of the rope in a transverse direction.

The inventive clamping device may be used in any assemblage and hoisting technique, such as in the building industry and construction work, in setting up ropeways or suspension bridges, laying cables, etc. The closing force of the clamping jaws of the inventive clamping device always exceeds the pull in the clamped rope. Finally, the design of the inventive clamping device is well adapted to its operation, and the construction is space and weight saving.

Accordingly, it is an object of the invention to provide an improved clamp wherein the movable clamping jaws are actuated by a pair of space longitudinal lever members having pivot points on a holder, the movable jaw and the arm for actuating the device.

A further object of the invention is to provide a clamp which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
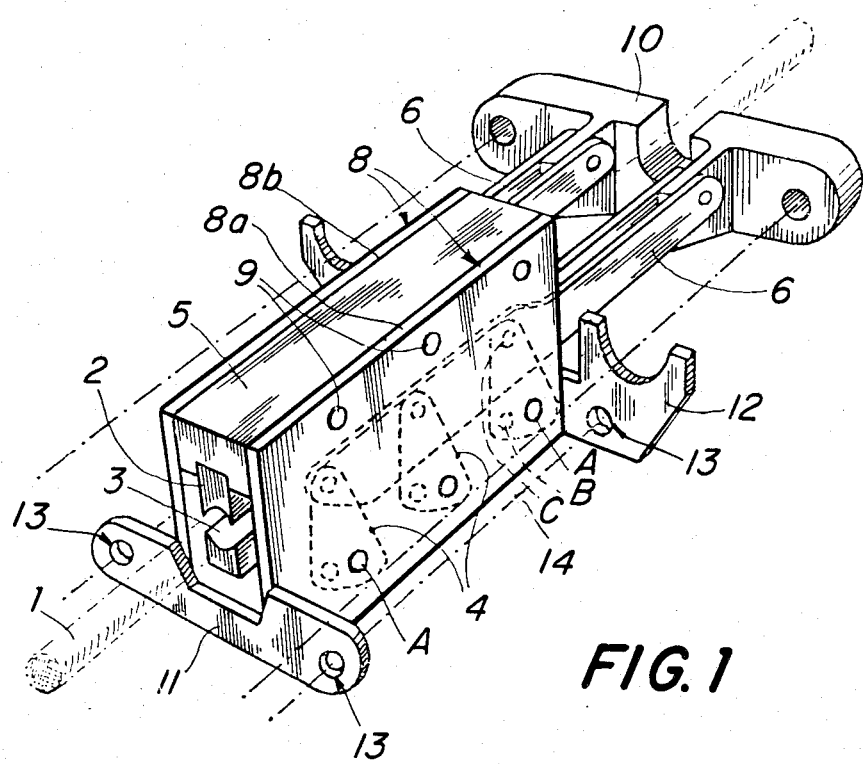
FIG. 1 is a perspective view of an inventive clamping device.
Figure 2:
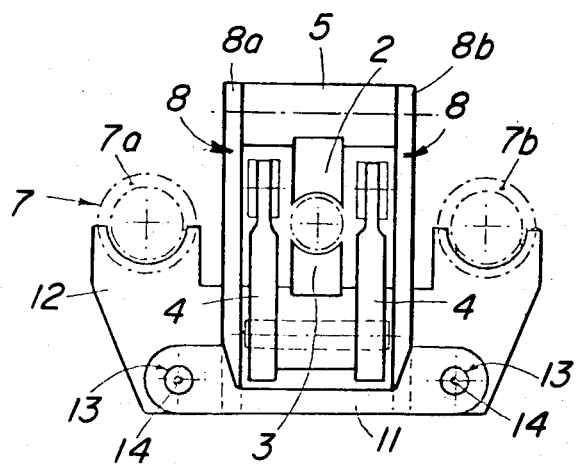
FIG. 2 is a front view of the device shown in FIG. 1.
Figure 3:
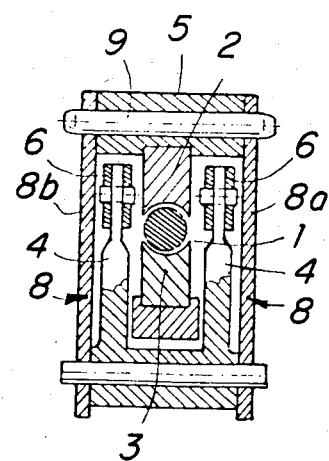
FIG. 3 is a vertical sectional view of the device shown in FIG. 1.

Referring to the drawings in particular the invention embodied therein comprises a clamping device which includes a holder generally designated 8 having side walls or cheeks 8a, and 8b and a top portion 5 which is secured to and formed as a part of a fixed jaw 2 which extends along the length of the holder. The movable jaw 3 is arranged within the holder 8 opposite to the fixed jaw 2 and the two jaws advantageously have rounded grooves for receiving a rope 1 therebetween. In accordance with the invention, the movable jaw 3 is mounted for movement toward and away from the fixed jaw 2 on at least two logitudinally spaced levers 4 which in the embodiment of the invention shown comprises three separate longitudinally spaced lever members 4. The lever members 4 have a first pivotal connection A to a side cheek or wall 8a of the holder 8, a second pivotal connection B to the movable clamping jaw 3 and a third pivotable connection C to the actuator arm 6. The actuator arm is moved by an actuator 7 connected to the arm to displace it substantially in a longitudinal direction to cause pivoting of the levers 4 and movement of the jaw 3 relative to the fixed jaw 2 for opening and closing the jaws.

The figures show a clamping device for a rope 1, comprising at least one pair of clamping jaws 2 and 5 and 3, and in which the clamping jaws 2,5 and 3 are connected through clamping levers 4 to a clamping jaws holder 8 and to an actuator 7 for effecting the opening and closing of the pairs of clamping jaws. One of the two clamping jaws 2,5 is fixed to clamping jaws holder 8 which is formed with cheeks 8a and 8b. The clamping levers are designed as angle levers 4 and are hinged on one side to the movable clamping jaw 3 as well as at the side of the movable clamping jaw 3, to the clamping jaw holder 8, and on the other side to at least one actuating arm 6 at each side of the fixed clamping jaw 2,5. The actuator 7 is connected to the clamping jaws holder 8 and to the actuator arm 6, to effect a relative back and forth movement between the clamping jaws holder 8 and the actuating arm 6. In the shown example, a hydraulically or pneumatically operating piston and cylinder unit forming the actuator 7 bears against the actuating arm 6 through which the load is transmitted, and moves the clamping jaws holder 8 to produce an opening and closing motion of the movable clamping jaw 3. Clamping jaws 5 and 3, angle levers 4 and partly actuating arms 6 extend between two cheeks 8a and 8b of clamping jaws holder 8. The fixed clamping jaw 2, 5 remains detachable due to provided cross pins 9 which are inserted and can be withdrawn, so that the introduction of rope 1 transversely to the longitudinal direction of the rope, or an exchange of the clamping jaws, is easy. Angle levers 4 and actuating arms 6 are provided on both sides of movable clamping jaw 3. Actuating arms 6 extend out of the two cheeks of clamping jaws holder 8 and are connected to a common yoke 10. The always three hinge points A, B, C of angle levers 4 are located to form a right triangle or obtuse triangle. As a rule, at least two pairs of angle levers, three in the shown example, are provided for the movable clamping jaw 3. In addition, movable clamping jaw 3 may be subdivided into a plurality of jaw sections, with at least two pairs of angle levers 4 being provided for every jaw section (not shown).

Cross bars 11, 12 are provided on clamping jaws holder 8 at each end of its cheeks and clamping jaws 2, 5 and 3. Cross bar 12 which is associated with yoke 10, and yoke 10 itself are adapted to be connected to actuator 7.

Actuator 7 advantageously comprises two piston-and-cylinder units 7a and 7b which are provided at either side of the cheeks of clamping jaws holder 8. Clamping jaws holder 8 is designed as a slide which is guided in the longitudinal direction of the rope. For this purpose, cross bars 11 and 12 which are provided on respective sides of the holder 8 are provided with guide bores 13 for receiving guide rods 14. All joints A, B and C are designed as cylindrical pins.

The shown clamping device is suitable particularly for being used in the tackle in which case it comprises at least two pairs of clamping jaws which operate on rope 1 alternatuely, and of which at least one is movable back and forth by a driving unit and with the interposition of a motion control to execute the working stroke. The motion control also ensures a correlation between the opening and closing motions of the pairs of clamping jaws 2, 5 and 3.

Figure 4:
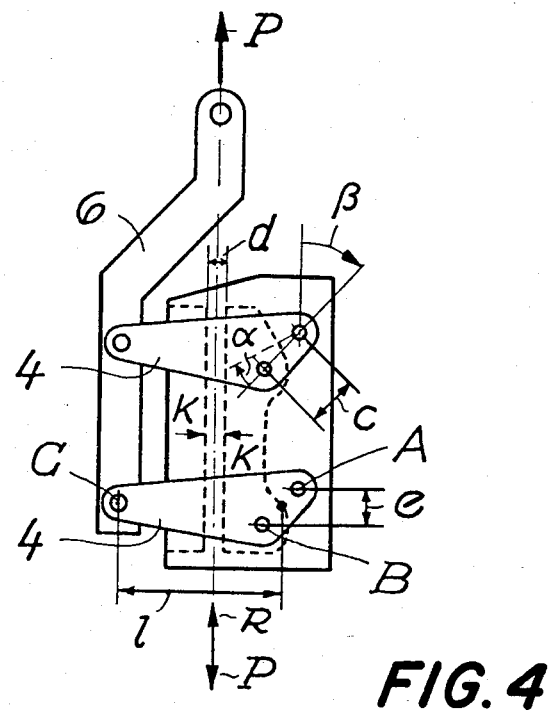
FIG. 4 is a schematic view indicating the geometry of an inventive clamping device.
Figure 5:
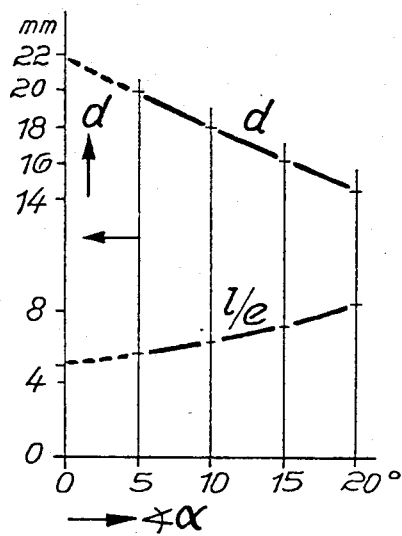
FIG. 5 is a diagram showing typical clamping ratios as a function of the rope diameter and the oblique position of the clamping levers according to FIG. 4.
Figure 6:
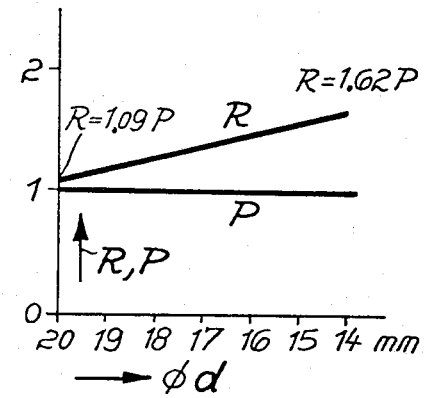
FIG. 6 is a diagram showing typical conditions for the frictions force according to FIG. 4.
Figure 7:
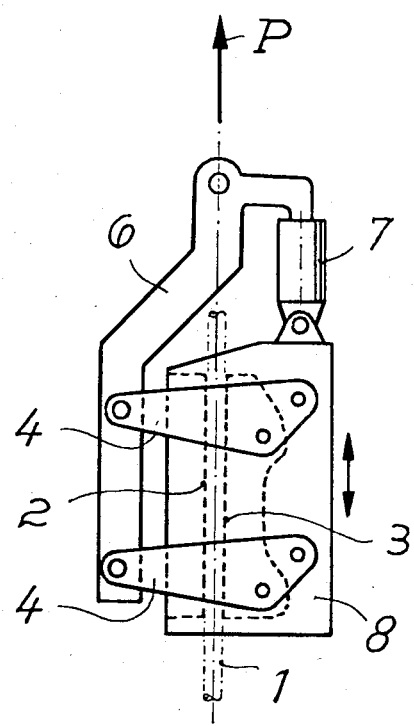
FIG. 7 is a diagrammatical view of another embodiment of the inventive clamping device comprising an actuator for the clamping jaws holder or the movable clamping jaw.

In FIG. 4, an angle $\beta = 45°$ is chosen for the open clamping jaws. This makes it possible to provide a larger distance between the points of support, to be able to make round, cylindrical hinge pins, on the other hand e becomes smaller with increasing angles $\beta$ or $\alpha$, so that the clamping ratio increases with the increasing load. The following numerical example shows the favorable properties of a pair of clamping jaws. The nominal diameter of the rope is 20 mm, the distance c is taken as 40 mm.

|  | $\alpha =$ | 0° | 5° | 10° | 15° | 20° |
|---|---|---|---|---|---|---|
|  | $\beta =$ | 45° | 50° | 55° | 60° | 65° |
| $l = l_o \cdot \cos(\beta - 52.5°)$ mm |  | 139 | 140 | 140 | 139 | 137 |
| $e = c \cdot \cos\beta$ mm |  | 28.28 | 25.71 | 22.94 | 20 | 16.90 |
| clamping ratio |  |  |  |  |  |  |
| $l/e \approx \dfrac{140}{c \cdot \cos\beta}$ |  | 4.95 | 5.45 | 6.10 | 6.95 | 8.10 |

-continued

| | | | | | |
|---|---|---|---|---|---|
| $\alpha =$ | 0° | 5° | 10° | 15° | 20° |
| $\beta =$ | 45° | 50° | 55° | 60° | 65° |
| $d = 50.64 - c \cdot \sin\beta$ mm | 21.7 | 20 | 17.8 | 16.0 | 14.40 |
| $\Delta = d - \phi$ mm | +1.7 | 0 | −2.2 | −4.0 | −5.6 |
| frictional force with $\mu = 0.1$ $R = 2K \cdot \mu = 2 \cdot P \cdot 1/e \cdot \mu$ | 0.96 · P | 1.09 · P | 1.22 · P | 1.39 · P | 1.62 · P |

Aside from the desirable increase of the frictional force with the decreasing diameter of the rope, a great variety of clearance openings between clamping jaws 2 and 5 and 3 is obtained, such as necessary for using the device with wire ropes of any construction.

While specific embodiments of the invention have been shown and described in detail to illustrate the application of the principles of the invention, it will be understood that the invention may be embodied otherwise without departing from such principles.

What is claimed is:

1. A clamping device for clamping rope, comprising:
   a holder;
   a fixed clamping jaw for clamping a rope carried by said holder;
   a movable clamping jaw arranged in said holder opposite said fixed clamping jaw and defining a gap with said fixed clamping jaw which lies on a path in said holder for a rope;
   at least two lever members spaced along said path and pivotally mounted at a first pivotal connection to said holder, each lever member having a second pivotal connection to said movable clamping jaw, and a third pivotal connection;
   an actuating arm extending parallel to said path and connected to said third pivotal connection of each lever member, said actuating arm being adjacent said fixed clamping jaw with said first, second and third pivotal connections of said levers each forming a triangle, said actuating arm being displaceable parallel to said path and with respect to said holder for pivoting said movable clamping jaw toward and away from said fixed clamping jaw to change said gap; and
   an actuator connected between said actuating arm and said holder for displacing said actuating arm with respect to said holder.

2. A clamping device according to claim 1, wherein said actuator comprises a fluid pressure operated piston and cylinder connected to said actuating arm.

3. A clamping device according to claim 1, wherein said second pivotal connection for each lever member is between said first and third pivotal connections in a direction transverse to said path, a distance between said third pivotal connection and a point midway said first and second pivotal connections in said transverse direction being greater than a distance between said first and second pivotal connections, said holder comprising side plates on opposite sides of said lever members with respect to said path with each lever member being between said plates, said movable clamping jaw being movably mounted between said plates and said fixed clamping jaw being connected between said plates.

4. A clamping device according to claim 3, wherein said lever members comprise angle lever members disposed within said holder said actuating arm including a portion which extends out of said holder, there being two levers connected between said holder and said movable jaw, said actuating arm including a common yoke outside of said holder connected to said actuator.

5. A clamping device according to claim 1, wherein pivotal connections form an obtuse triangle.

* * * * *